(12) United States Patent
Derr et al.

(10) Patent No.: US 8,966,483 B2
(45) Date of Patent: Feb. 24, 2015

(54) METHOD AND DEVICE FOR OPTIMIZING EXECUTION OF SOFTWARE APPLICATIONS IN A MULTIPROCESSOR ARCHITECTURE COMPRISING SEVERAL INPUT/OUTPUT CONTROLLERS AND SECONDARY COMPUTING UNITS

(75) Inventors: Simon Derr, Saint-Martin d'Heres (FR); Philippe Garrigues, Montbonnot (FR); Benoit Welterlen, Grenoble (FR)

(73) Assignee: Bull SAS, Les Clayes sous Bois (FR)

(*) Notice: Subject to any disclaimer, the term of this patent is extended or adjusted under 35 U.S.C. 154(b) by 241 days.

(21) Appl. No.: 13/508,876

(22) PCT Filed: Oct. 28, 2010

(86) PCT No.: PCT/FR2010/052312
§ 371 (c)(1),
(2), (4) Date: May 9, 2012

(87) PCT Pub. No.: WO2011/058260
PCT Pub. Date: May 19, 2011

(65) Prior Publication Data
US 2012/0222031 A1    Aug. 30, 2012

(30) Foreign Application Priority Data
Nov. 13, 2009  (FR) .................................. 09 05453

(51) Int. Cl.
G06F 9/46    (2006.01)
G06F 9/50    (2006.01)

(52) U.S. Cl.
CPC .................................... *G06F 9/5027* (2013.01)
USPC ......................................................... 718/100

(58) Field of Classification Search
USPC ......................................................... 718/100
See application file for complete search history.

(56) References Cited

U.S. PATENT DOCUMENTS

2003/0088608 A1* 5/2003 McDonald .................... 709/106

FOREIGN PATENT DOCUMENTS

JP    10232788    9/1998
JP    2007512613   5/2007
(Continued)

OTHER PUBLICATIONS

Brian Railing, Getting System Topology Information on Windows, Sep. 12, 2008, Windows Server Performance Team Blog.*
(Continued)

*Primary Examiner* — Emerson Puente
*Assistant Examiner* — Steven Do
(74) *Attorney, Agent, or Firm* — Knobbe Martens Olson and Bear LLP

(57) ABSTRACT

The invention relates in particular to the optimization of the execution of a software application in a system having multiprocessor architecture including a plurality of input/output controllers and secondary processing units. After determining (300) the system topology, a call to a function to be executed by a secondary processing unit is intercepted (305). The main processor that generated said call is identified (310). A secondary processing unit is then identified (315) according to the main processor identified and according to the topology of said system. Advantageously, the secondary processing unit thus identified is the secondary processing unit that is the closest to the identified main processor. The call is then modified (320) in order to force the execution of at least one part of the function called in the identified secondary processing unit.

10 Claims, 3 Drawing Sheets

(56) References Cited

FOREIGN PATENT DOCUMENTS

| JP | 2009151745 | 7/2009 |
|----|------------|--------|
| WO | WO 01/18641 | 2/2000 |
| WO | WO 2006/083043 | 8/2006 |

OTHER PUBLICATIONS

Johnson et al., Interconnect Topologies With Point-to-Point Rings, Dec. 1991, Computer Sciences Technical Report #1058.*

Mehdiratta, et al. "A Bottom-up Approach to Task Scheduling on Distributed Memory Multiprocessors", Department of Computer Science, Binghamton NY, 1994 International Conference on Parallel Processing, IEEE Aug. 15, 1994 pp. 151-154.

Ma, et al. "A Grid-distance Based Scheduling for Grid Resource Management", Northwestern Polytechnical University, Eight International Conference on Beijing China, Nov. 30, 2005, pp. 576-581.

PCT International Search Report for PCT Application No. PCT/FR2010/052312, mailed Apr. 4, 2011.

Japanese Office Action dated Sep. 10, 2013 for Japanese Patent Application No. JP 2012-531488 which shares priority of French Patent Application No. FR 0905453, filed Nov. 13, 2009, A Google Machine Translation is provided with this document.

* cited by examiner

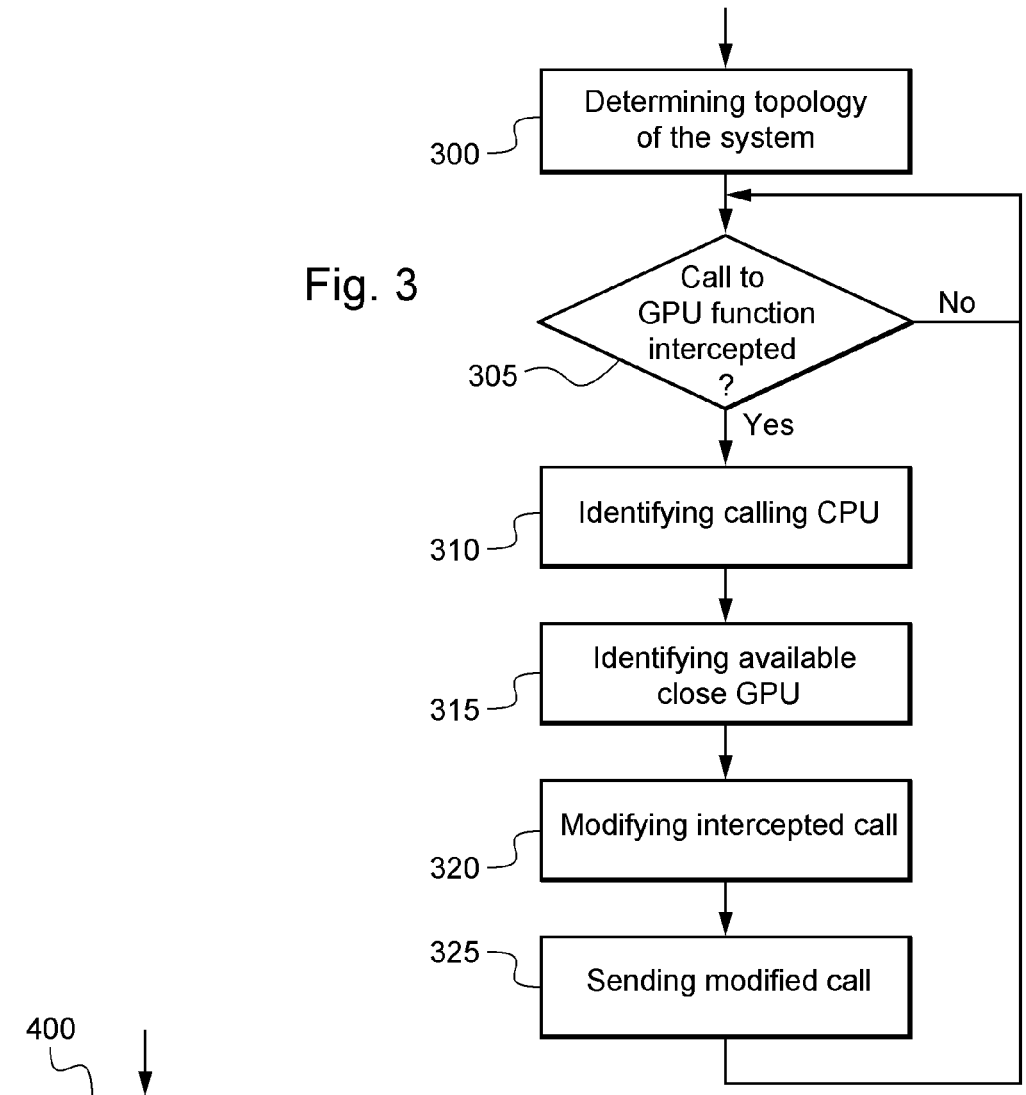
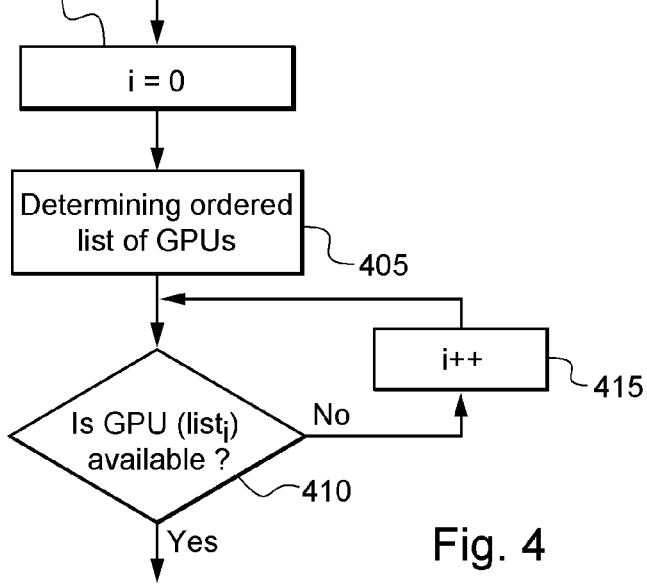

METHOD AND DEVICE FOR OPTIMIZING EXECUTION OF SOFTWARE APPLICATIONS IN A MULTIPROCESSOR ARCHITECTURE COMPRISING SEVERAL INPUT/OUTPUT CONTROLLERS AND SECONDARY COMPUTING UNITS

CROSS-REFERENCE TO RELATED APPLICATIONS

This application is a U.S. National Phase under 35 U.S.C. §371 of International Application PCT/FR2010/052312, filed Oct. 28, 2010, which designated the U.S., and which claims priority under 35 U.S.C. §119 to French Patent Application Number 0905453, filed on Nov. 13, 2009. The disclosures of the above-described applications are hereby expressly incorporated by reference in their entireties.

The present invention concerns the placing of computations in a multiprocessor architecture and more particularly a method and device for optimizing execution of software applications in a multiprocessor architecture comprising several input/output controllers and secondary computing units such as graphics processors.

Due to the physical constraints linked to microprocessors which limit their performance, architectures have been developed based on the implementation of several microprocessors, making it possible to perform parallel computations. These multiprocessor architectures enable the execution of a high number of applications and/or of applications divided up into steps, using a large amount of computation.

The processors implemented in such architectures are generally capable of parallel processing of complex processes, termed threads.

Furthermore, specific processors have been developed to meet particular needs, in particular for the operations of display and manipulation of graphics data. These processors, termed Graphics Processing Units or GPUs act massively in parallel and make it possible in particular to simultaneously process a high number of simple processes. They are particularly efficient for processing repetitive computations. However, while those processors have been developed to meet very specific needs, some of them today enable non-specific computations to be carried out. By way of illustration, the CUDA technology (CUDA being a trademark), developed by the company nVidia, is a response to problems of complex computations.

Thus, to improve the performance of HPC computers (HPC standing for High-Performance Computing), architectures combining conventional processors with specific processors such as graphics processors have been developed.

The implementation of these different types of processors requires a high quantity of data transfers between them and the memory. Consequently, input/output controllers are used. They are for example components of a chipset (integrated electronics components for managing the digital data stream between processors, the memory and peripherals) which provide a bridge between the interconnections of standard processors and input/output busses such as busses of PCI-e type (PCI-e standing for Peripheral Component Interconnect Express).

FIG. 1 illustrates an example of such a multiprocessor architecture comprising several input/output controllers and graphics processors.

As illustrated, the system 100 here comprises four main processors referenced 105-1 to 105-4 (generically referenced 105), for example processors of Nehalem type (Nehalem being a trademark) developed by the company Intel. Each of these processors here comprises four cores (quad-core processors) represented diagrammatically. By way of illustration, the processor 105-1 comprises the cores 110-11 to 110-14.

According to this example, each main processor is connected to all the other main processors via a fast communication link, for example a link of QPI type (QPI standing for Quick Path Interconnect).

The system 100 further comprises two input/output controllers 115-1 and 115-2, also called I/O Hub or IOH (standing for Input/Output Hub). Each IOH here is linked to two main processors. The IOH 115-1 is thus linked to the processors 105-1 and 105-4 whereas the IOH 115-2 is linked to the processors 105-2 and 105-3. The connection between IOHs and processors is, for example, of QPI type.

The IOHs are furthermore each connected to one or more graphics processors which may in particular be grouped together on a specific card. The IOHs 115-1 and 115-2 are connected here to the graphics processors 120-1 and 120-2, respectively. The communication link between an IOH and a set of graphics processors is, for example, of the PCI-e type.

Such an architecture thus enables the processors 105-1 and 105-4 to directly access the graphics processor 120-1 and enables the processors 105-2 and 105-3 to directly access the graphics processor 120-2. Furthermore, the processors 105-1 and 105-4 may access the graphics processor 120-2 indirectly, via the interconnection of processors 105-2 and 105-3. Similarly, the processors 105-2 and 105-3 may access the graphics processor 120-1 via the interconnection of processors 105-1 and 105-4.

When such a system is implemented, a library is generally used to manage the calls from the applications executed by the main processors to the functions executed by the graphics processors. In particular an object of this library is to determine the graphics processor or processors which should execute those functions.

It is observed here that graphics processors may be identified by the users according to certain of their characteristics such as their performance or their version. Thus, through the library used to manage the calls to the functions executed by graphics processors, users may use that information to choose those graphics processors according to the functions to execute.

Although these solutions have proved their effectiveness, there is nevertheless a constant need to improve them in order to meet the ever increasing needs for computation, required by numerous applications, in particular in the field of simulation, which is what the described invention provides.

The invention thus relates to a method for optimizing the execution of a software application comprising at least one call to at least one function to be executed by a secondary computing unit, said software application being executed in a system comprising at least one plurality of main processors, a plurality of secondary computing units and a plurality of input/output controllers, each input/output controller of said plurality of input/output controllers being linked to at least one main processor of said plurality of main processors and each secondary computing unit of said plurality of secondary computing units being linked to an input/output controller of said plurality of input/output controllers, this method comprising the following steps, determining the topology of said system;
intercepting said at least one call to said at least one function to be executed by at least one secondary computing unit;
identifying the main processor that generated said at least one call;

identifying at least one secondary computing unit in said plurality of secondary computing units, said at least one secondary computing unit being identified according to said identified main processor and according to said topology of said system; and, modifying said at least one call to force the execution of at least one part of said at least one function in said at least one identified secondary computing unit.

The method according to the invention thus makes it possible to choose the secondary computing units in which must be executed called functions according to the topology of the system and the place of the main processors at the origin of those calls in that topology in order to optimize the placing of execution of the functions.

According to a particular embodiment, the step of determining said topology of said system comprises a step of constituting at least one list that is associated with at least one of said main processors, said list comprising at least one identifier of at least one of said secondary computing units and a measurement of distance between said at least one of said main processors and said at least one of said secondary computing units corresponding to said at least one identifier. Such a list makes it possible to quickly identify a secondary computing unit on the basis of a particular main processor and of the distance between them.

Advantageously, the method further comprises a step of testing availability of said at least one identified secondary computing unit in order to select a secondary computing unit available for executing the called function.

According to a particular embodiment, said at least one identified secondary computing unit is the closest available secondary computing unit to said main processor that generated said at least one call. The latency time induced by the distance between a main processor and a secondary computing unit executing a function called by the latter are thereby minimized.

Said topology is, preferably, determined according to information specific to an operating system implemented in said system. The topology of the system may thereby be determined without requiring additional information.

According to a particular embodiment, said step of determining said topology comprises the following steps, identifying at least one secondary computing unit of said plurality of secondary computing units;

identifying at least one bus to which is connected said at least one secondary computing unit identified during said step of determining said topology; and identifying at least one main processor of said plurality of main processors connected to said at least one identified bus.

The topology of a system may thus be determined from information specific to an operating system such as LINUX.

Still according to a particular embodiment, said step of modifying said at least one call comprises a step of overloading a function executed at the time of a processing operation of said at least one call. The invention may thus be implemented easily without requiring any particular modification with regard to the software applications executed by the system.

Still according to a particular embodiment, the steps described previously are implemented in a library that is dynamically loaded prior to the execution of said software application. The invention is then particularly simple to implement.

The invention is also directed to a computer program comprising instructions adapted to the implementation of each of the steps of the method described earlier when said program is executed on a computer as well as a device comprising means adapted to the implementation of each of the steps of the method described earlier.

The advantages procured by that computer program and that device are similar to those referred to above.

Other advantages, objects and features of the present invention will emerge from the following detailed description, given by way of non-limiting example, relative to the accompanying drawings in which.

FIG. 3 diagrammatically illustrates certain steps of an example of the method implemented to force the choice of a particular secondary computing unit when a call is made to a function to be executed by a secondary computing unit; and, FIG. 4 illustrates more precisely the step of identifying a secondary computing unit presented in the previous Figure.

When a single input/output controller (or IOH, standing for Input/Output Hub) is used in a computing system, the main processors (or CPUs, standing for Central Processing Units) linked to that IOH access the secondary computing units at the same speed, for example the graphics processors (or GPUs, which stands for Graphics Processing Units), which are linked to it. However, when several IOHs are present, it is possible, depending on the topology of the computing system, for several main processors not to access a given secondary computing unit at the same speed.

Figure 1:
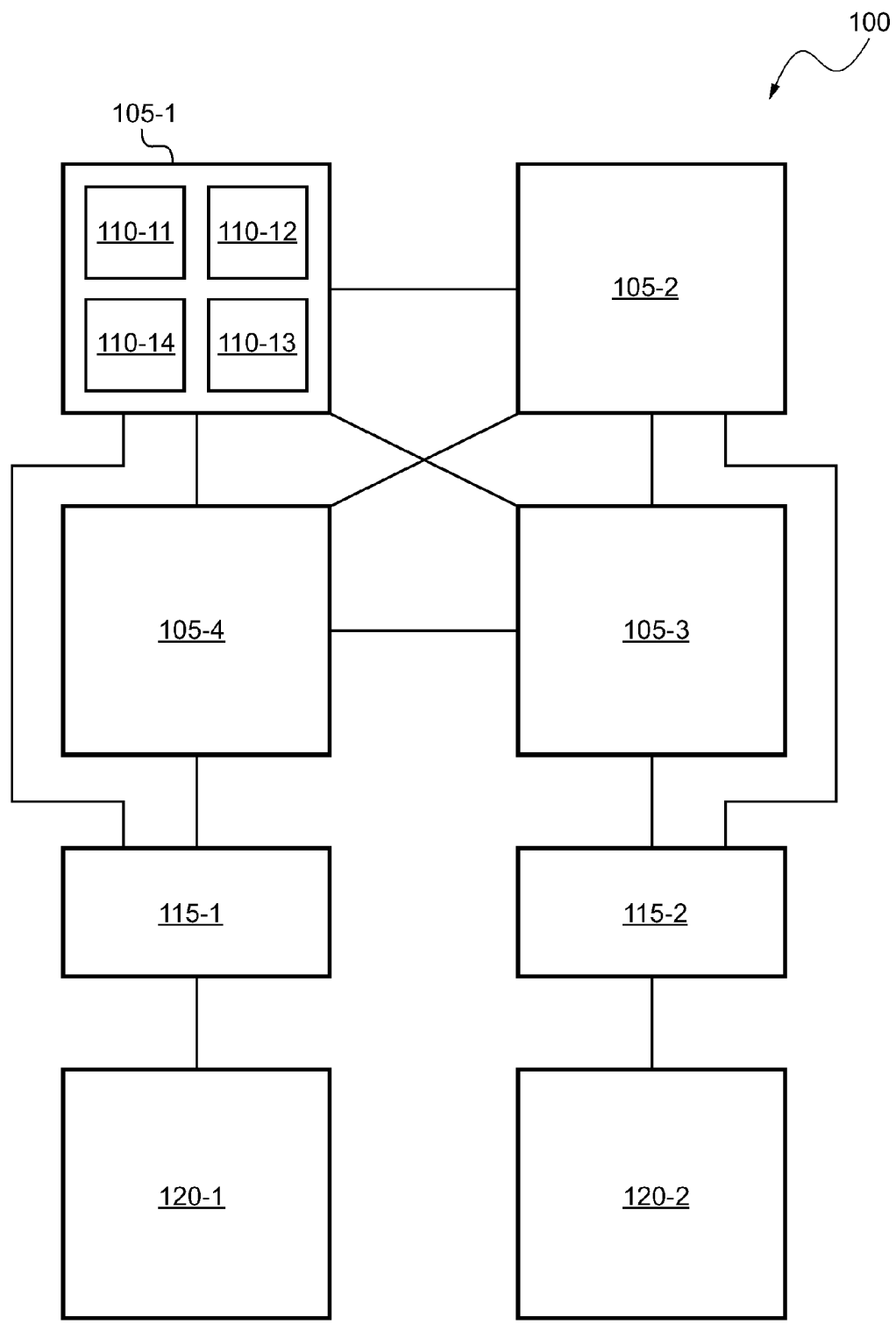
FIG. 1 illustrates an example of a simple multiprocessor architecture comprising several input/output controllers and graphics processors in which the invention may be implemented.

For example, with reference to FIG. 1, if the CPUs 105-1 and 105-4 both access at the same speed the GPUs 120-1 to which they are directly linked via IOH 115-1 and if the CPUs 105-2 and 105-3 also both access at the same speed the GPUs 120-1 to which they are indirectly linked via IOH 115-1, the CPUs 105-1 and 105-4 do not access the GPUs 120-1 at the same speed as the CPUs 105-2 and 105-3.

It has thus been observed that an application or a process that is executing on a main processor linked directly to a IOH must, as much as possible, communicate with secondary computing units linked to that IOH to avoid degrading the performance of the computing system. This problem is all the more true on larger systems such as that illustrated in FIG. 2.

As illustrated therein, the computing system here comprises four sub-systems having the same architecture and each comprising several main processors and several secondary computing units, here graphics processors.

By way of illustration, the sub-system 200-1 comprises four main processors referenced 205-1 to 205-4, for example processors of Nehalem type. Each main processor is here connected to all the other main processors of its sub-group via a fast communication link, for example a link of QPI type (QPI standing for Quick Path Interconnect).

Sub-system 200-1 further comprises a communication component 210 to which are connected all the main processors 205-1 to 205-4 and to which are also connected two IOHs 215-1 and 215-2. Such a communication component is, for example, a component of BCS type (BCS standing for Bull Coherent Switch).

The IOHs are furthermore each connected to one or more graphics processors. The IOHs 215-1 and 215-2 are linked here to the graphics processors 220-1 and 220-2, respectively. The communication link between an IOH and a graphics processor is, for example, of PCI-e type (PCI-e standing for Peripheral Component Interconnect Express).

Furthermore, several components of BCS type may be connected together, for example with a point-to-point connection mode of XCSI type (XCSI standing for eXtended Common System Interface). It is thus possible to link the sub-systems together via the network 225 of XCSI type.

Thus, according to this architecture, each processor is capable of calling the functions of each graphics processor.

However, as mentioned earlier, it has been observed that not all the CPUs access all the GPUs at the same speed. For example, whereas all four of the CPUs 205-1 to 205-4 access at the same speed the GPUs 220-1 and 220-2 to which they are directly linked via the IOHs 215-1 and 215-2, respectively, and the communication component 210, the CPU 205'-1 of the sub-system 200-3 accesses those GPUs at a lower speed due to the latency introduced by the communication component 210' and the network 225.

Figure 2:
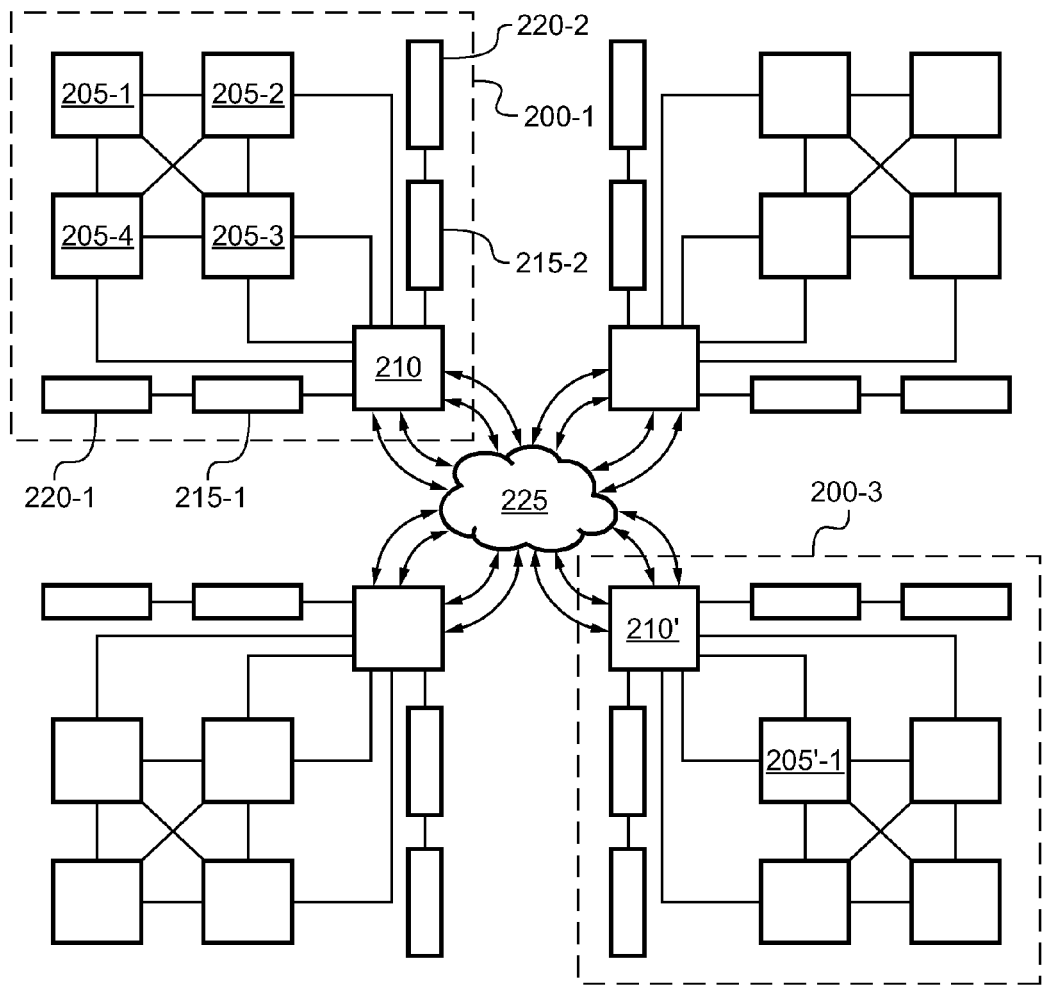
FIG. 2 illustrates an example of a complex multiprocessor architecture comprising several input/output controllers and graphics processors in which the invention may be implemented.

When a process or an application executed on a main processor of a computing system such as those illustrated in FIGS. 1 and 2 calls a function to be executed by a secondary computing unit, the kernel of the operating system of that system manages that call, for example through a library loaded in advance. The role of the library is in particular to determine the parameters enabling the execution of the called function, in particular to determine the secondary computing unit or units to execute the function.

The invention is in particular directed to intercepting those calls to force the choice of the secondary computing unit or units to execute the called function or functions. In other words, the call to a function coming from a main processor and directed to reserving a secondary computing unit to execute that function is intercepted in order to force the choice of that secondary computing unit in order for it be as close as possible to the main processor at the origin of the call, preferably linked to the same input/output controller as that to which is linked the main processor at the origin of the call.

FIG. 3 diagrammatically illustrates certain steps of an example of the method implemented to force the choice of a particular secondary computing unit when a call is made to a function to be executed by a secondary computing unit.

As illustrated, a first step (step 300) consists of determining the topology of the computing system to determine, in particular, the links between the main processors, the secondary computing units and the input/output controllers.

Part of this step may in particular consists in analyzing diagnostic messages or the execution journal of the kernel of the operating system implemented in the computing system, generally called log files. It may also consist in exploring certain data of the hierarchical structure of the data (file system) of the operating system.

Thus, for example, in the hierarchical structure of the data in the Linux operating system (Linux is a trademark), there are in particular locations known under the name of /sys and /proc, pseudo-files containing information on the system. They are provided by the kernel of the operating system and make it possible to determine the topology of the computing system.

By way of illustration, the topology of a computing system may be determined in the following manner,
- identifying the secondary computing units;
- analyzing the busses of the computing system to identify the busses (and the input/output controllers) to which the secondary computing units are connected; and,
- identifying the main processors connected to the busses to which the secondary computing units are connected.

The identification of the nVidia secondary computing units may, for example, be performed on the basis of information supplied to the following location:

/proc/driver/nvidia/cards/ wherein indications are stored relative to the peripheral drivers of each peripheral of nVidia type and, consequently, relative to those peripherals themselves.

It is observed here that the file system /proc is the directory containing the pseudo file system of the kernel, making it possible to access the information on the hardware, the configuration of the kernel and on the processes in course of execution.

Thus, by exploring the directories of this type, it is possible to identify all the secondary computing units of the computing system.

Similarly, it is possible to access the configuration of the busses of the computing system to identify the busses to which the secondary computing units identified beforehand are connected. This analysis may, for example, be carried out on the basis of the information supplied to the following location:

/sys/bus/pci/devices/0000:xxxxx wherein information is stored relative to the busses used and, consequently, relative to the input/output controllers used.

It is observed here that the file system /sys is the directory containing, in particular, the pseudo file system for the peripheral managers making it possible to obtain information on all the objects of the kernel, in particular on all the peripherals of the computing system. It contains particular information specific to characteristics defined more generally in the file system /proc.

Lastly, it is possible to determine the main processors linked to the busses identified beforehand, for example on the basis of information supplied to the following location:

/proc/self/stat wherein is present information relative to the processors used by the calling application.

Similarly, it is possible to determine the connections between the main processors, and, consequently, to establish a structure representing the distance between each secondary computing unit and each main processor. Such a structure may, for example, be stored in a table. An example of such a table is given in the Appendix (Table 1). It corresponds to the topology of the computing system illustrated in FIG. 1.

Thus, as indicated, the main processor 105-1 is directly connected to the secondary computing unit 120-1 (zero distance) whereas that main processor is indirectly connected to the secondary computing unit 120-2, via a main processor (distance equal to one).

Advantageously, this table is arranged in the form of ordered lists such that, when a main processor is selected, it is possible to directly identify the closest secondary computing units, these being classified by increasing distance. Such an examples of classified lists, based on Table 1, is illustrated in the Appendix (Table 2). Thus, according to this example, when the main processor 105-1 is selected here, it is immediately apparent on reading the first line that the closest secondary computing unit is the secondary computing unit 120-1, the next one being the secondary computing unit 120-2. Other methods may be used to define the topology of the computing system. In particular, that topology may be statically defined in a file.

A following step (step 305) is directed to detecting and intercepting the calls by the processes or applications executed by the main processors to functions to be executed by secondary computing units such as GPUs.

When such a call is detected and intercepted, the main processor at the origin of the call is identified (step 310). This identification may in particular be carried out by consulting the data stored in the file /proc/self/stat.

This step is followed by a step of determining a list of at least one secondary computing unit available for executing the called function or functions and which is situated at a predetermined distance from the previously identified main processor, preferably as close as possible (step 315).

Even though in general terms the object is to identify the closest available secondary computing unit to the main processor at the origin of the call to a function to be executed by a secondary computing unit, it is nevertheless possible that several secondary computing units may be necessary. In this case, the number of secondary computing units identified may depend on the nature of the called function or functions, that is to say the number of secondary computing units required for executing the function or functions.

Furthermore, it is observed that it is possible for the closest secondary computing unit not to be selected at a given time in order for it to remain available for executing a function called later.

The topology of the computing system as previously determined is used to identify, according to the identifier of the main processor at the origin of the call, the secondary computing unit or units to be used to execute the called function or functions.

For these purposes, the main processor is first of all identified to deduce therefrom the secondary computing units which are linked to it with the corresponding distances. This may involve an ordered list of secondary computing units. This information is directly obtained from the topology which is determined, for example, using a similar table to Table 2 given in the Appendix. According to a preferred embodiment, the secondary computing units are analyzed sequentially, for example in the order of the ordered list of the secondary computing units, to identify the closest available secondary computing unit or units.

An example of implementation of this step 315 is illustrated in detail in FIG. 4.

After having set to zero a variable i representing an index in a list of secondary computing units (step 400), an ordered list of the secondary computing units accessible by the main processor identified is determined (step 405). Such a list is, preferably, predetermined as described with reference to Table 2 presented in the Appendix. A test is then carried out to determine whether the secondary computing unit having the index i in the ordered list is available (step 410). If it is not available, the index i is incremented by one (step 415) and the preceding test is repeated. If, on the contrary, the secondary computing unit having the index i is available it is selected to execute the function called by the main processor.

If several secondary computing units are necessary, steps 410 and 415 are repeated until the required number of secondary computing units is obtained.

Naturally, when several secondary computing units have to be selected, they may be selected so as to be the closest to the selected main processor, so as to be all at the same distance as close as possible to the selected processor, or so as to be at the same predetermined distance from the selected processor.

By way of illustration, in accordance with the topology defined previously with reference to FIG. 1, if the CPU at the origin of the call is CPU 105-1, it is deduced therefrom that the ordered list of the GPUs is the following: 120-1, 120-2. On the basis of the latter, a test is carried out to determine whether the first GPU, that is to say the closest GPU 120-1, is available. In the negative, a similar test is carried out on the next secondary computing unit, that is to say here on the secondary computing unit 120-2. If it is, it is selected.

When the secondary computing unit or units have thus been determined, the call is modified (step 320) before being sent (step 325).

The modification of a call consists here in loading a library which overloads the attribution call of the secondary computing unit for example by calling the function cudaSetDevice( ) which serves to select the secondary computing unit which will execute the called function.

More particularly, the function cudaSetDevice( ) is intercepted here and called with the parameters making it possible to attribute the identified secondary computing units, for example the closest secondary computing units.

The steps already described (steps 305 to 325) are repeated to process the following calls to execute other functions on other secondary computing units (when a secondary computing unit is attributed to a process, the function described with reference to FIG. 3 is not re-executed for each call to the secondary computing unit). This process is repeated so long as calls may be generated.

According to a particular embodiment, a library adapted to implement the algorithm described with reference to FIG. 3 is created and loaded dynamically, for example using the environment variable LD_PRELOAD, before the execution of applications calling functions carried out in secondary computing units. It is noted here that the environment variable LD_PRELOAD makes it possible to force the loading of an additional library on executing a software application. Such a library makes it possible to overload a call to a function executed when a function is to be executed in a secondary computing unit.

Thus, the use of a library the object of which is to intercept calls to functions executed by secondary computing units and to modify those calls to force the location for execution of those functions according to the topology of the system enables the execution of those software applications to be accelerated without modifying them.

Naturally, to satisfy specific needs, a person skilled in the art will be able to make amendments to the preceding description. In particular, if the secondary computing units may, in particular, be graphics processors, particular circuits may also be used such as FPGAs (standing for Field-Programmable Gate Arrays) or ASICs (standing for Application-Specific Integrated Circuits).

APPENDIX

TABLE 1

|  | 120-1 | 120-2 |
| --- | --- | --- |
| 105-1 | 0 | 1 |
| 105-2 | 1 | 0 |
| 105-3 | 1 | 0 |
| 105-4 | 0 | 1 |

TABLE 2

| 105-1 | 120-1 | 120-2 |
| --- | --- | --- |
| 105-2 | 120-2 | 120-1 |
| 105-3 | 120-2 | 120-1 |
| 105-4 | 120-1 | 120-2 |

The invention claimed is:

1. A method of optimizing execution of a software application, the application comprising at least one call to at least one function to be executed by a secondary computing unit, the software application being executed in a system comprising a plurality of main processors, a plurality of secondary computing units, and a plurality of input/output controllers, wherein each input/output controller is linked to at least one main processor, and wherein each secondary computing unit is linked to an input/output controller, the method comprising:
   determining a topology of the system;
   intercepting the at least one call to the at least one function;
   identifying which main processor generated the one call;
   identifying at least one secondary computing unit according to the identified main processor and according to the topology of the system; and
   modifying the one call to force at least one part of the one function to be executed in the identified secondary computing unit;
   wherein the determining of the topology comprises determining a set of links between the main processors, the secondary computing units and the input/output controllers,
   wherein the at least one identified secondary computer unit is connected to the main processor that generated the at least one call through at least one associated input/output controllers according to a linked relationship of the topology, and
   wherein the at least one identified secondary computing unit is the closest available secondary computing unit to the main processor that generated the at least one call.

2. The method according to claim 1, wherein determining the topology of the system comprises forming at least one list that is associated with at least one of the main processors, wherein the list comprises at least one identifier of at least one of the secondary computing units having the associated input/output controller and a measurement of distance between the at least one main processor and the at least one secondary computing unit corresponding to said at least one identifier.

3. The method according to claim 1, further comprising testing the availability of the at least one identified secondary computing unit.

4. The method according to claim 1, wherein the topology is determined according to information specific to an operating system implemented in the system.

5. The method according to claim 4, wherein determining said topology comprises:
   identifying at least one secondary computing unit;
   identifying at least one bus and at least one input/output controller which is connected to the identified secondary computing unit; and
   identifying at least one main processor connected to the identified bus.

6. The method according to claim 1, wherein modifying the one call comprises overloading a function by adding parameters identifying the identified secondary computing units executed at the time of a processing operation of the one call.

7. The method according to claim 5, wherein identifying the secondary computing unit, identifying the bus and the input/output controller, and identifying the main processor are implemented in a library dynamically loaded prior to the execution of the software function.

8. A non-transitory computer readable medium comprising persistent instructions, which, when executed cause a computer system to perform a method, the system comprising a plurality of main processors, a plurality of secondary computing units, and a plurality of input/output controllers, wherein each input/output controller is linked to at least one main processor, and wherein each secondary computing unit is linked to an input/output controller, the method comprising:
   determining a topology of the system;
   intercepting at least one call to at least one function;
   identifying which main processor generated the one call;
   identifying at least one secondary computing unit according to the identified main processor and according to the topology of the system; and
   modifying the one call to force at least one part of the one function to be executed in the identified secondary computing unit,
   wherein the determining of the topology comprises determining a set of links between the main processors, the secondary computing units and the input/output controllers,
   wherein the at least one identified secondary computer unit is connected to the main processor that generated the at least one call through at least one associated input/output controllers according to a linked relationship of the topology, and
   wherein the at least one identified secondary computing unit is the closest available secondary computing unit to the main processor that generated the at least one call.

9. A computer system, comprising:
   a plurality of main processors;
   a plurality of secondary computing units; and
   a plurality of input/output controllers, wherein each input/output controller is linked to at least one main processor, and wherein each secondary computing unit is linked to an input/output controller,
   wherein the system is configured to:
      determine a topology of the system,
      intercept at least one call to at least one function,
      identify which main processor generated the one call,
      identify at least one secondary computing unit according to the identified main processor and according to the topology of the system, and
      modify the one call to force at least one part of the one function to be executed in the identified secondary computing unit,
   wherein the determining of the topology comprises determining a set of links between the main processors, the secondary computing units and the input/output controllers,
   wherein the at least one identified secondary computer unit is connected to the main processor that generated the at least one call through at least one associated input/output controllers according to a linked relationship of the topology, and
   wherein the at least one identified secondary computing unit is the closest available secondary computing unit to the main processor that generated the at least one call.

10. The method according to claim 2, wherein the determining of the topology further comprises measuring a distance between the at least one main processor and the at least one secondary computing unit having the associated input/output controller.

* * * * *